(12) United States Patent
Schneider et al.

(10) Patent No.: US 6,951,269 B2
(45) Date of Patent: Oct. 4, 2005

(54) DEVICE FOR GUIDING A DRIVING TORQUE

(75) Inventors: Rudolf Schneider, Meckenbeuren (DE); Ünal Gazyakan, Friedrichshafen (DE); Detlef Baasch, Friedrichshafen (DE); Gerhard Gumpoltsberger, Friedrichshafen (DE); Michael Erenhoch, Friedrichshafen (DE); Barbara Schmohl, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/416,400

(22) PCT Filed: Nov. 21, 2001

(86) PCT No.: PCT/EP01/13502
§ 371 (c)(1),
(2), (4) Date: May 12, 2003

(87) PCT Pub. No.: WO02/42657
PCT Pub. Date: May 30, 2002

(65) Prior Publication Data
US 2004/0026203 A1 Feb. 12, 2004

(30) Foreign Application Priority Data
Nov. 23, 2000 (DE) .......................................... 100 58 199

(51) Int. Cl.$^7$ .......................... F16H 3/085; F16D 21/02; F16D 67/06

(52) U.S. Cl. ................... 192/18 B; 192/48.2; 192/48.5; 192/48.91; 192/84.92

(58) Field of Search ............................. 192/18 B, 12 D, 192/48.2, 48.9, 48.91, 48.5, 84.92; 74/330; 180/233, 248

(56) References Cited

U.S. PATENT DOCUMENTS

| 2,514,385 | A | * | 7/1950 | Garbarini et al. | .......... 192/48.2 |
| 2,591,989 | A | * | 4/1952 | Winther | .................... 192/48.2 |
| 2,605,650 | A | * | 8/1952 | Winter et al. | .................. 74/330 |
| 2,609,900 | A | * | 9/1952 | Neracher et al. | .......... 192/48.2 |
| 2,946,418 | A | | 7/1960 | Leeson, Jr. | .................. 192/12 |
| 2,962,142 | A | * | 11/1960 | Straub | ...................... 192/18 B |
| 3,175,665 | A | * | 3/1965 | Albrecht | .................... 192/48.2 |
| 3,691,861 | A | * | 9/1972 | Sturmer | ...................... 74/330 |
| 3,777,864 | A | * | 12/1973 | Marti | ........................ 192/18 B |
| 3,921,770 | A | * | 11/1975 | Daab et al. | .............. 192/12 D |

(Continued)

FOREIGN PATENT DOCUMENTS

| DE | 23 450 | 6/1951 | |
| DE | 1 187 866 | 10/1965 | |
| DE | 1 575 907 | 1/1970 | |
| DE | 27 11 550 | 9/1978 | ........... F16D/67/06 |
| DE | 266 624 A1 | 4/1989 | ........... F16D/67/06 |
| DE | 198 33 254 A1 | 4/1999 | ......... F16D/27/105 |
| EP | 0 341 653 A2 | 11/1989 | ........... F16D/27/01 |
| JP | 10141392 | 5/1998 | ........... F16D/27/12 |

Primary Examiner—Rodney H. Bonck
(74) Attorney, Agent, or Firm—Davis & Bujold, P.L.L.C.

(57) ABSTRACT

A device for guiding torque of one drive shaft (3) connected with a driving appliance (2) onto a first or a second output shaft (4, 5). A torque fed via the drive shaft (3) can be applied, respectively, to one of the two output shafts (4, 5) depending on a control of a changeover device (6). The changeover device (6) comprises one electromagnetic clutch (7) which can produce a power flow between the drive shaft (3) and the first or the second output shaft (4 or 5). The electromagnetic clutch (7) comprises a coupling element (8) which is guided and displaced in an axially and rotatable manner and is fixedly connected with the drive shaft (3) and depending on a current supply of the electromagnetic clutch (7) produces the power flow between the drive shaft (3) and the first or the second output shaft (4 or 5).

11 Claims, 1 Drawing Sheet

U.S. PATENT DOCUMENTS

| | | |
|---|---|---|
| 4,185,722 A | 1/1980 | Palmer et al. ............. 192/18 B |
| 4,387,794 A * | 6/1983 | Schneider et al. ........ 192/18 B |
| 4,429,773 A * | 2/1984 | Dohi et al. ................ 192/18 B |
| 4,498,066 A | 2/1985 | Fujiwara et al. ............ 335/281 |
| 4,572,343 A * | 2/1986 | Boffelli ..................... 192/48.2 |
| 5,057,062 A * | 10/1991 | Yamasaki et al. ........... 180/248 |
| 5,172,798 A * | 12/1992 | Mabee ..................... 192/18 B |
| 5,918,716 A | 7/1999 | Arcaro .................... 192/84.81 |

\* cited by examiner

DEVICE FOR GUIDING A DRIVING TORQUE

FIELD OF THE INVENTION

The invention relates to a device for guiding a torque from a drive shaft connected with a driving device onto a first or a second output shaft.

BACKGROUND OF THE INVENTION

Devices for guiding a driving torque are known, for example, from the practice of the transmission technology where it is often required to drive alternately two output shafts. To this end, as a rule, two machines such as electromotors are used by means of which can respectively be actuated one of the output shaft and which are controlled by an electronic control device so that only one of the transmission units is active for sequential actuation of the respective shafts.

However, the use of two transmission units for two drive shafts disadvantageously requires a large installation space which is problematic in the case of cramped conditions of installation space like those prevailing as a rule in transmissions of motor vehicles.

The problem on which this invention is based is to make a device of simple construction available for guiding torque onto one or two output shafts that needs a small installation space and whose mode of operation can be implemented by a simple control.

SUMMARY OF THE INVENTION

The inventive device for guiding a driving torque in which a power flow between the drive shaft and the first or the second output shaft can be produced by a coupling element of the electromagnetic clutch non-rotatably connected with the drive shaft, advantageously makes an independent drive available for two units each connected with one of the output shafts.

It is of special advantage here that both output shafts can be alternatively driven only via one machine or a single electromotor of the driving system whereby, on one hand, substantially less installation space is needed and, on the other, the cost of production is lowered.

It is also advantageous that the drive mechanism of both output shafts can be implemented via the drive shaft with a simple control and regulation technology for the control of the electromagnetic clutch, since only the current supply of the electromagnetic clutch has to be adjusted for changing over the power flow between the drive shaft and the first or the second output shaft and operating the driving device.

By the inventive use of the electromagnetic clutch, a compact and low-wear construction of the inventive device is obtained which, in combination with the saving of a second driving appliance, advantageously results in a further reduction of the installation space needed and extension of the service life of the appliances.

The inventive device has proved specially advantageous for the selective driving of appliances of motor vehicles, specially in a transfer case transmission and transmission arrangement such as are commonly used in four wheel drive vehicles. In such four wheel drive vehicles, a multi-disc lock or clutch brake in the front or rear axle drive transmission units and the transfer case, for example, can be easily actuated therewith using only one driving appliance.

BRIEF DESCRIPTION OF THE DRAWING

The invention will now be described, by way of example, with reference to the accompanying drawings in which:

The single FIGURE of the drawing shows a device 1 for driving a torque guided by a drive shaft 3 connected with a driving appliance 2 onto a first output shaft 4 or a second output shaft 5.

DETAILED DESCRIPTION OF THE INVENTION

Figure 1:
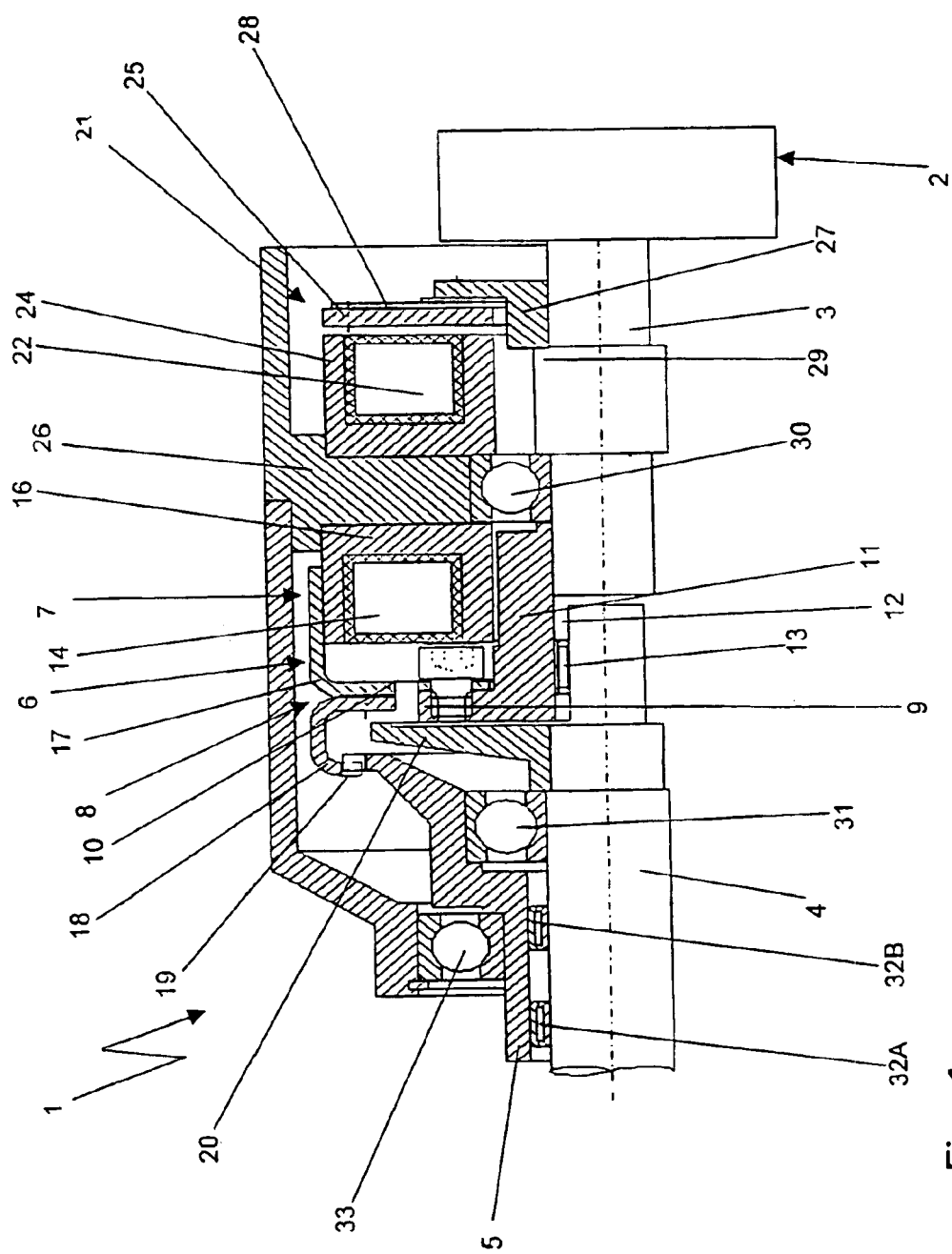

Depending on control of a changeover device 6, the torque of the drive shaft 3 is applied onto one of the two output shafts 4, 5. The changeover device 6 has an electromagnetic clutch 7 through which a power flow can be produced for transmitting the driving torque between the drive shaft 3 and the first or the second output shaft 4, 5.

The electromagnetic clutch 7 has a coupling element 8 which is guided and displaced in an axial and rotatable manner, is non-rotatably connected with the drive shaft 3 and, depending on a current supply of the electromagnetic clutch 7, produces the power flow between the drive shaft 3 and the first output shaft 4 or the second output shaft 5.

In an area of its end facing the output shafts 4, 5, the drive shaft 3 is developed with a flange-like collar 9 on which a resilient element 10 of the coupling element 8, designed here as a diaphragm spring, is non-rotatably fastened.

In the instant embodiment, the flange-like collar 9 is designed integral with a hollow cylindrical part 11 firmly connected with the drive shaft 3, the connection between the hollow cylindrical part 11 and the drive shaft 3 being provided in the area of the end of the hollow cylindrical part remote from the output shafts 4, 5 and the area of the end of the drive shaft 3 facing the output shafts 4, 5. The hollow cylindrical part 11 extends in an axial direction of the drive shaft 3 in a manner such that the first output shaft 4 engages in a central hole 12 of the hollow cylindrical part 11, an anti-friction bearing 13 being located between the first output shaft 4 and the hollow cylindrical part 11 for absorbing radial forces acting upon the flange-like collar 9 and the hollow cylindrical part 11.

The respective arrangement or development of the hollow cylindrical part 11 and of the anti-friction bearing 13, between the first output shaft 4 and the hollow cylindrical part 11, ensures exact positioning of the parts relative to each other and a compact design of the entire device 1.

The electromagnetic clutch 7 further has an integral cast coil located in an annular magnet body 16 of U-shaped cross-section.

In addition to the resilient element 10, the coupling element 8 is designed with an annular guide element 17 of L-shaped cross-section which is movably guided to the magnet body 16 of the electromagnetic clutch 7 in a rotatable manner, the same as in the axial direction of the drive shaft 3, the guide path of the guide element 17 to the magnet body 16 being designed so that a rotational movement of the drive shaft 3 is transmitted to the hollow cylindrical part 11, the resilient element 10 and also to the guide element 17 and can be carried out by the latter.

An annular power transmission element 18, designed at least almost U-shaped in cross-section, is fastened on the guide element 17, the guide element 17 and the power transmission element 18 constitute the armature of the electromagnetic clutch 7. In the current-supplied state of the electromagnetic clutch 7, the guide element 17 and the power transmission element 18 are displaced in the axial direction of the drive shaft 3 in the direction of both output shafts 4, 5 along the guide path of the magnet body 16 against a retaining force generated by a reversible deformation of the resilient element 10 designed as a leaf spring.

The second output shaft 5 is designed as a hollow shaft that surrounds the first output shaft 4 and, on its end facing the drive shaft 3, can be brought to operative connection with the coupling element. 8 of a toothing 19 of the power transmission element 18 so that a non-rotatable connection exists between the drive shaft 3 and the second output shaft 5 when the electromagnetic clutch 7 is not current supplied. The toothing 19 of the power transmission element 18 is designed as an inner toothing extending over the extra periphery of the power transmission element 18 and it engages in a spline of the second output shaft 5 which is formed on one end of the second output shaft 5 facing the drive shaft 3 and expanding in the form of a funnel.

It is evidently at the expert's discretion to provide a force-locking such as a frictional connection via two friction faces, instead of the form-locking connection between the power transmission element 18 and the second output shaft 5. In addition, the non-rotatable connection can also be formed by another suitable form-locking type of connection, instead of the toothing described.

The first output shaft 4 is provided with a collar 20, in the area of its end facing the drive shaft 3, with which, in the current-supplied state of the electromagnetic clutch 7, contacts the coupling element 8 or the power transmission element 18 in a manner such that a non-rotatable connection exists between the drive shaft 3 and the first output shaft 4 and the driving torque introduced via the drive shaft 3 is transmitted by the coupling element 8 to the first output shaft 4.

According to the FIGURE, the collar 20 of the first output shaft 4 is designed as a separate, flange-like part connected with the first output shaft 4 via a press fit. It is obviously at the expert's discretion to design the collar 20 integral with the output shaft 4, the same as to provide another connection, between the first output shaft 4 and the collar 20, that is force-locking or form-locking, but in any case non-rotatable.

In the current-supplied state of the electromagnetic clutch 7, the coupling element 8 and the guide element 17, respectively, and the power transmission element 18 are pressed by the electric field produced by the cast integral coil 14 of the electromagnetic clutch 7 in the axial direction to the collar 20, the toothing 19 of the power transmission element being disengaged from the spline of the second output shaft 5. In the current-supplied state of the electromagnetic clutch 7, the connection between the drive shaft 3 and the second output shaft 5 is thus released and a frictional lock made between the power transmission element 18 and the collar 20 so that a power flow exists between the drive shaft 3 and the first output shaft 4 via the coupling element 8.

When the electromagnetic clutch 7 is not supplied with current, the power transmission element 18 and the guide element 17 are displaced in the axial direction of the drive shaft 3 from the collar 20 to the coil 14 of the electromagnetic clutch 7 by the potential energy fed to the resilient element 10 when the electromagnetic clutch 7 is supplied with current. At the same time, the frictional connection between the power transmission element 18 and the collar 20 is released and the toothing 19 of the power transmission element 18 is again in engagement with the spline of the second output shaft 5.

In the area of the drive shaft 3, to discharge the driving applicant 2, an electromagnetic brake 21 is provided with which the drive shaft 3 is non-rotatably held in one position depending on a current supply of the electromagnetic brake 21. The electromagnetic brake 21 has a cast integral coil 22 which is located in an annular magnet body 24 designed with U-shaped cross-section.

The electromagnetic brake 21 further comprises a brake element 25 non-rotatable with the drive shaft 3 and displaceable in the axial direction of the drive shaft 3 forming, in the current-supplied state of the electromagnetic brake 21, a power flow between drive shaft 3 and the electromagnetic brake 21. When the electromagnetic brake 21 is not current supplied, the brake element 25 is disposed in the axial direction of the drive shaft 3 spaced form the coil 22 and the magnet body 24 of the electromagnetic brake 21. As a result of the contact between the brake element 25 and the magnet body 24 of the electromagnetic brake 21 and a fastening of the magnet body 24 in a housing 26 of the device 1, the drive shaft 3 is held, via the electromagnetic brake 21, in a desired standing position with applied torque without a drive torque or a counter-torque having to be applied by the driving appliance.

The applied torque can act, for example, by the appliance of a motor vehicle connected with the first drive shaft 4 or the second output shaft 5, upon the drive shaft 3. For the case that the driving appliance 2 has to apply a counter-torque to counteract the torque applied to the two output shafts 4, 5 or to one output shaft, a motor such as an electromotor of the driving appliance 2 must be permanently supplied with current. But this is undesirable, since a permanent current supply of the electromotor is needed to maintain the counter-torque and this requires a great use of energy resulting in an undesirable heating of the driving unit 2. This is successfully prevented by using the electromagnetic brake 21.

In order to release the frictional connection between the brake element 25 and the magnet body 24 of the electromagnetic brake 21, with certainty during transition from the current-supplied state to the not current-supplied state of the electromagnetic brake 21, one more resilient element 28 is provided between a shaft flange 27 of the drive shaft 3 and the brake element 25 which, as a result of the axial displacement of the brake element 25 in the current-supplied state of the electromagnetic clutch 21, undergoes a reversible deformation and stores potential spring energy. During the transition to a state not current supplied of the electromagnetic brake 21, the stored energy results in an axial displacement of the brake element 25 from the magnet body 24 of the electromagnetic brake 21 back to an idle position of the brake element 25. The shaft flange 27 is fixedly connected with the drive shaft 3, via a press fit, and retained in the axial direction of the drive shaft 3 via a stop 29 of the drive shaft 3.

The same as the electromagnetic brake 21, the electromagnetic clutch 7 is fixedly and immovably situated in the housing 26 via a mounting support 16. Besides, the electromagnetic clutch 7 and the electromagnetic brake 21 basically have the same construction, the electromagnetic fields produced having different effects upon the surrounding parts. The field of the electromagnetic clutch 7 effects an ejection of the coupling element 8 whereas the field of the electromagnetic brake 21 effects an attraction of the brake element 25 which constitutes the armature of the electromagnetic brake 21. The magnet bodies 16, 24 are made of iron in order to be optimally able to form the electromagnetic field.

The drive shaft 3 is supported in the housing 26 via a ball bearing 30 which absorbs axial forces acting upon the drive shaft 3. The second output shaft 5 is likewise rotatably supported via a ball bearing 33 in the housing 26, the first output shaft 4 being rotatably supported via the anti-friction bearing 13 in the hollow cylindrical part 11 and via two other anti-friction bearings 32A, 32B, the same as an additional ball bearing 13, in the second output shaft 5.

The above described device 1 is used for the selective driving of appliances of a motor vehicle, the appliances to be selectively driven constituting, on one hand, a multi-disc lock or clutch brake for locking a drive train of a rear-wheel drive and a drive train of a front-wheel drive and, on the other, a transfer case transmission.

| Reference numerals | |
| --- | --- |
| 1 | device |
| 2 | driving appliance |
| 3 | drive shaft |
| 4 | first output shaft |
| 5 | second output shaft |
| 6 | changeover device |
| 7 | electromagnetic clutch |
| 8 | coupling element |
| 9 | flange-like collar |
| 10 | resilient element |
| 11 | hollow cylindrical part |
| 12 | central hole |
| 13 | anti-friction bearing |
| 14 | cast integral coil of the electromagnetic clutch |
| 16 | magnet body of the electromagnetic clutch |
| 17 | guide element |
| 18 | power transmission element |
| 19 | toothing of the power transmission element |
| 20 | collar |
| 21 | electromagnetic brake |
| 22 | cast integral coil of the electromagnetic brake |
| 24 | magnet body of the electric brake |
| 25 | brake element |
| 26 | housing |
| 27 | shaft flange of the drive shaft |
| 28 | resilient element |
| 29 | stop of the drive shaft |
| 30 | ball bearing |
| 31 | ball bearing |
| 32A, 32B | anti-friction bearing |
| 33 | ball bearing |

What is claimed is:

1. A changeover device (6) for selectively applying a driving torque applied to a first end of a drive shaft (3) to a selected one of a first output shaft (4) and a second output shaft (5), comprising:

the first output shaft (4) and the second output shaft (5), wherein
  the first output shaft (4) is coaxial with and axially displaced with respect to a second end of the drive shaft (3), and
  the second output shaft (5) is a hollow shaft surrounding the first output shaft 4,
an electromagnetic clutch (7), including
  an integral cast coil (14) located in a non-rotatable annular magnet body (16) of U-shaped cross-section coaxial to the drive shaft (3),
  a coupling element (8) coaxial with the drive shaft (3) and axially movable with respect to the drive shaft (3) toward one of a first position toward the first end of the drive shaft (3) and a second position toward the second end of the drive shaft (3) dependent on a current supply to the cast coil (14), the coupling element (8) including
    an annular guide element (17) of L-shaped cross-section connected to the coupling element (8) enclosing and rotatably and axially movable with respect to the annular magnet body (16),
    an annular power transmission element (18) connected to and axially and rotatably movable with the annular guide element (17) and including inwardly circumferential engagement toothing (19), and
  a resilient element (10) coaxially and non-rotatably mounted to a hollow cylindrical part (11) surrounding and non-rotatably connected with the second end of the drive shaft (3) to bias the annular guide element (17) axially along the drive shaft (3) toward one of the first position and the second position, wherein
    the hollow cylindrical part (11) encloses the second end of the drive shaft 3 with the first output shaft 4 rotatably supported in an axial hollow (12) of the hollow cylindrical part 11 by an anti-friction bearing 13, thereby centering the drive shaft (3), the hollow cylindrical part (11) and the first output shaft (4) on a common axis, and wherein
  the second output shaft (5) includes radially extending spline teeth engaging with the toothing (19) of the power transmission element (18) to transmit torque from the drive shaft (3) to the second output shaft (5) when the annular guide element (17) is axially displaced toward the first position and disengaging from the toothing (18) when the annular guide is axially displaced toward the second position, and
  the first output shaft (4) includes an annular friction flange (20) engaging with the power transmission element (18) to transmit torque from the drive shaft (3) to the first output shaft (4) when the annular guide element (17) is axially displaced toward the second position and disengaging when the annular guide element (17) is displaced toward the first position.

2. The device according to claim 1, wherein the drive shaft (3) has a flange-like collar, adjacent an end area facing the first and second output shafts (4, 5) (9), on which a resilient element (10) of the coupling element (8) is non-rotatably fastened.

3. The device according to claim 1, wherein an end of the second output shaft (5) facing the drive shaft (3) can be brought into operative connection with the coupling element (8) in a manner such that a non-rotatable connection exists between the drive shaft (3) and the second output shaft (5) when the electromagnetic clutch (7) is in a currentless state.

4. The device according to claim 3, wherein one of a form-locking and force-locking connection is provided to form the non-rotatable connection between the drive shaft (3) and one of the first and second output shafts (4 or 5).

5. The device according to claim 1, wherein said first output shaft (4) has a collar (20), in an area of a end thereof facing the drive shaft (3), by which the electromagnetic clutch (7) in the current-supplied stats contacts the coupling element (8) so that a non-rotatable connection exists between the drive shaft (3) and the first output shaft (4).

6. The device according to claim 1, wherein a connection between the drive shaft (3) and the second output shaft (5) is disengaged during the current-supplied state of the electromagnetic clutch (7).

7. The device according to claim 1, wherein the connection between the drive shaft (3) and the first output shaft (4) is disengaged during the currentless state of the electromagnetic clutch (7).

8. The device according to claim 1, wherein an electromagnetic brake (21) coaxial with the drive shaft (3) and axial with the electromagnetic clutch (7) located between the drive shaft (3) and the electromagnetic clutch (7) to brake the driving appliance (2), by which the drive shaft (3) is non-rotatably retained in one position depending of a current supply state of the electromagnetic brake (21).

9. The device according to claim 8, wherein the electromagnetic brake (21) has a brake element (25) which is non-rotatable with the drive shaft (3) and displaceable in the axial direction of the drive shaft (3) and, during a current-supplied state of the electromagnetic brake (21), forms a power flow between the drive shaft (3) and the electromagnetic brake (21).

10. The device according to claim 8, wherein the electromagnetic brake (21) and the electromagnetic clutch (7) are fixedly situated in a housing.

11. The device according to claim 1, wherein the device is used for selectively driving an appliance of a motor vehicle.

* * * * *